Dec. 21, 1937.   C. J. ROCQUIN   2,102,748
THEFT PREVENTING DEVICE FOR PLANTS
Filed June 15, 1936
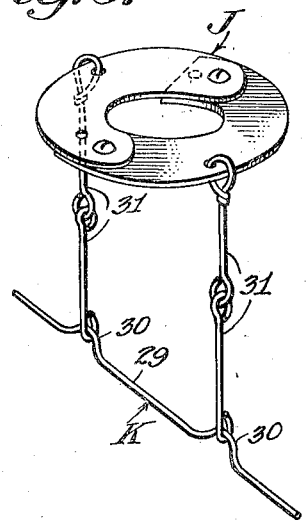
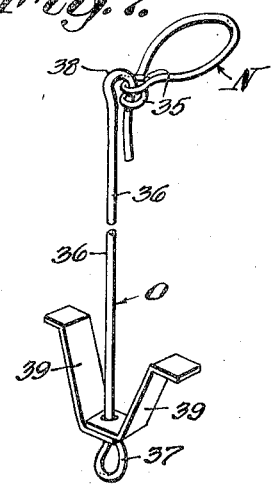
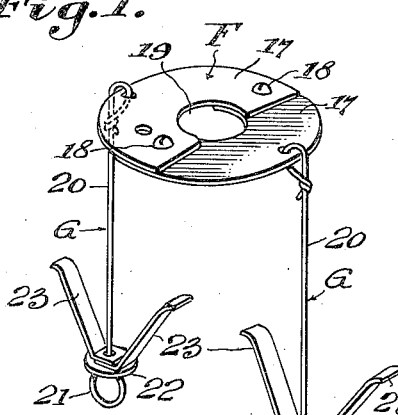
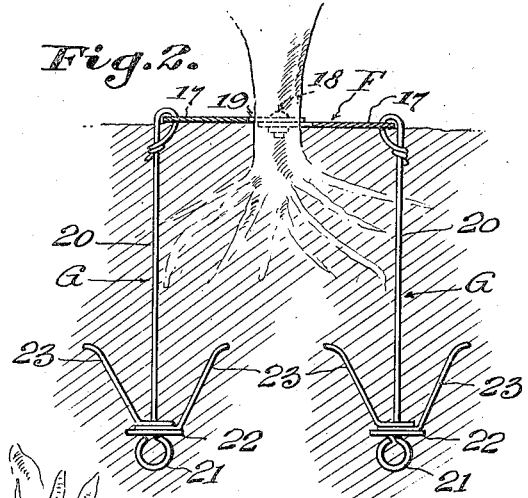
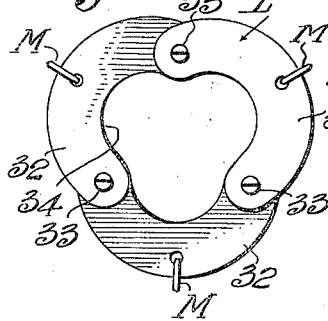
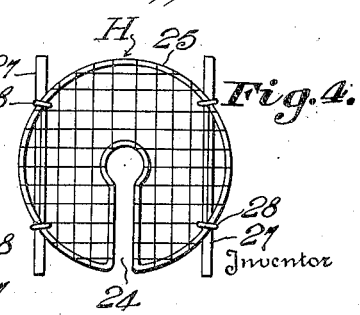
C. J. ROCQUIN
By Baldwin & Light
Attorneys Patented Dec. 21, 1937

2,102,748

UNITED STATES PATENT OFFICE 2,102,748

THEFT-PREVENTING DEVICE FOR PLANTS

Camille J. Rocquin, New Orleans, La.

Application June 15, 1936, Serial No. 85,357

8 Claims. (Cl. 47—25)

This invention relates to new and useful devices for reducing to a minimum the surreptitious removal of growing plants and flowers.

The principal object of the invention is to provide such a device which may be readily applied to growing plants and which when so applied will be securely anchored to the ground.

Another object of the invention is to provide a device of the character described which is simple in construction and is therefore cheap to manufacture.

With these and other objects in view which will more fully appear, the nature of the invention will be more clearly understood by following the description, the appended claims, and the several views illustrated in the accompanying drawing.

In the drawing:

Figure 1 is a perspective view of one form of my invention,

Figure 2 is a vertical section showing the application thereof to a growing plant, Figure 3 is a vertical section of another form of my invention showing the application thereof to a growing plant, Figure 4 is a plan view of the device shown in Figure 3, Figure 5 is a perspective view of another form of my invention, Figure 6 is a plan view of a modified form thereof, and Figure 7 is a perspective view of another form of my invention.

Like reference numerals designate corresponding parts throughout the several figures of the drawing.

Referring to the accompanying drawing, my invention comprises an attachable collar which is adapted to embrace a plant stem above the roots, and at least one ground-engaging anchor connected to the collar.

In Figures 1 and 2, I have disclosed a form of my invention wherein a collar F comprises a pair of arcuate links or plates 17, 17 which are detachably connected at their ends by bolts 18, 18 and forming therebetween a resultant opening 19. A ground-engaging anchor G is attached to each plate or link 17. Each anchor comprises a rod 20 having its upper end loosely connected with the associated link or plate 17 and the lower end is formed into an eye forming a resultant stop 21. Mounted on the rod 20 above the stop 21 is a stop collar 22 and loosely mounted on the rod above the stop collar 22 is a pair of outwardly extending arms 23. When it is desired to apply this device to a growing plant, vertical openings are formed in the ground on opposite sides of the plant stem. The links or plates 17 of the collar are separated and the ground-engaging anchors positioned in said openings. The plates or links 17 are then connected and the earth is then tamped above the outwardly extending arms 23 of the anchors.

In Figures 3 and 4, I have shown another form of my invention which includes a collar H having an inwardly extending stem receiving slot 24 formed therein. This collar comprises a circular wire frame 25 having a portion thereof bent to conform to the shape of the slot 24 and a wire mesh fabric being formed with a slot which registers with the slot 24. Ground-engaging anchors I are connected to the collar H. Each anchor comprises a horizontal rod 27 and a pair of vertical rods 28 which connect the anchor rods 27 with the collar H.

In Figure 5, I have disclosed a still further modification of my invention. A collar J, similar to the collar F shown in Figures 1 and 2, is employed. A ground-engaging anchor K includes an anchor rod 29 having spaced bent portions 30, 30 formed therein and two pairs of links 31, 31. The distance between the spaced bent portions 30, 30 is substantially equal to the diameter of the collar J and the lower ends of the links 31 engage said portions 30 and have their upper ends connected to the collar at substantially diametrically opposite points.

In Figure 6, I have shown a slightly modified form of my invention wherein the collar L consists of three arcuate links or plates 32 which are connected together by bolts 33 to form a resultant opening 34 for the stem of the plant. Ground-engaging anchors M of any suitable construction are connected at their upper ends with the respective links or plates 32.

In Figure 7, I have illustrated a still further modification of my invention wherein the collar N consists of an open-ended wire ring, the end thereof being formed into attaching eyes 35, 35. A ground-engaging anchor O is removably attached to the collar N. This anchor comprises a wire rod 36 having a stop eye 37 formed at its lower end, and an open hook 38 formed at its upper end, the latter removably engaging in the attaching eyes 35, 35 of the anchor. Freely mounted on the rod 36 above the stop eye 37, is a pair of outwardly extending ground-engaging arms 39, 39.

From the foregoing, it will be seen that my invention comprises an attachable collar which is adapted to embrace the plant stem directly above the roots, and at least one ground-engaging anchor connected to the collar whereby sufficient sistance to the withdrawal of the growing plant will be provided should any unauthorized person attempt to remove the plant from its bed.

It is of course to be understood that the details of structure and arrangement of parts may be variously changed and modified without departing from the spirit and scope of my invention.

I claim:

1. A theft-preventing device for plants comprising an attachable collar adapted to closely embrace the plant stem directly above the roots so as to prevent withdrawal of the rooted portion of the stem therethrough, and at least one ground-engaging anchor attached to said collar.

2. A theft-preventing device for plants comprising an attachable collar adapted to closely surround the plant stem directly above the roots so as to prevent withdrawal of the rooted portion of the stem therethrough, and at least one ground-engaging anchor attached to said collar.

3. A theft-preventing device for plants comprising an attachable collar adapted to embrace the plant stem directly above the roots and consisting of a plurality of detachably connected links, and a ground-engaging anchor attached to at least one of said links.

4. A theft-preventing device for plants comprising an attachable collar having an inwardly extending radial slot and shaped to closely embrace the plant stem so as to prevent withdrawal of the rooted portion of the stem therethrough, and at least one ground-engaging anchor attached to said collar.

5. A theft-preventing device for plants comprising an attachable collar having an inwardly extending radial slot for receiving the plant stem, said collar comprising a circular frame having a portion extending inwardly to form said slot, and a wire mesh fabric attached to said frame and having a slot formed therein in registration with the slot of the frame, and at least one ground-engaging anchor attached to said collar.

6. A theft-preventing device comprising an attachable anchor consisting of an open-ended ring having attaching eyes at its ends, and a ground-engaging anchor removably engaging said eyes.

7. A theft-preventing device comprising an attachable anchor consisting of an open-ended ring having attaching eyes at its ends, and a ground-engaging anchor removably engaging said eyes, said anchor comprising a rod having ground-engaging arms at its lower end and a hook at its upper end, the latter engaging said attaching eyes.

8. A theft-preventing device for plants comprising an attachable collar adapted to embrace the plant stem directly above the roots and consisting of a plurality of detachably connected links, and a ground-engaging anchor attached to each said link.

CAMILLE J. ROCQUIN.